Figure 1:
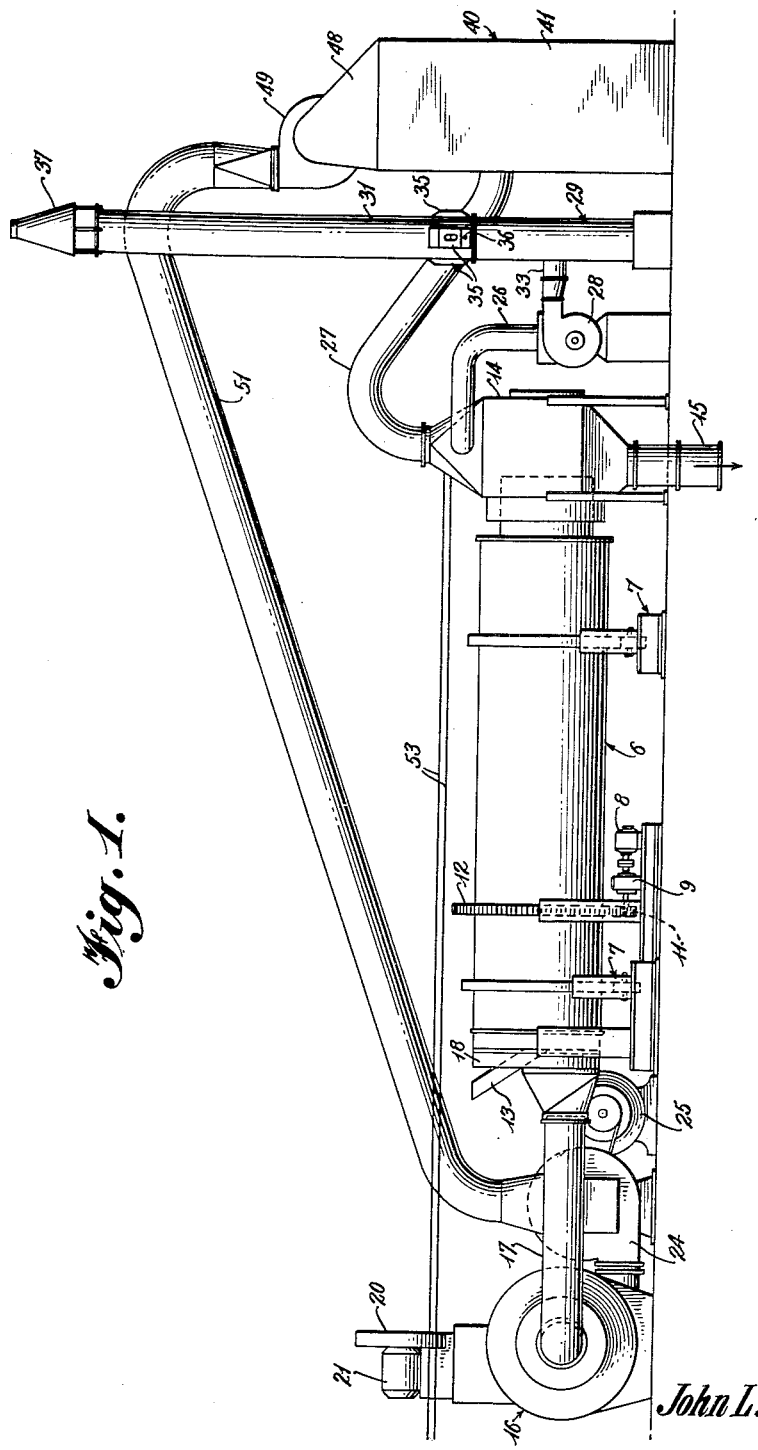

Oct. 18, 1955

J. L. ERISMAN 2,720,710

METHOD FOR DRYING METAL SCRAP

Filed Dec. 22, 1952

3 Sheets-Sheet 1

INVENTOR
John L. Erisman

BY
ATTORNEY

Oct. 18, 1955
J. L. ERISMAN
2,720,710
METHOD FOR DRYING METAL SCRAP
Filed Dec. 22, 1952
3 Sheets-Sheet 2
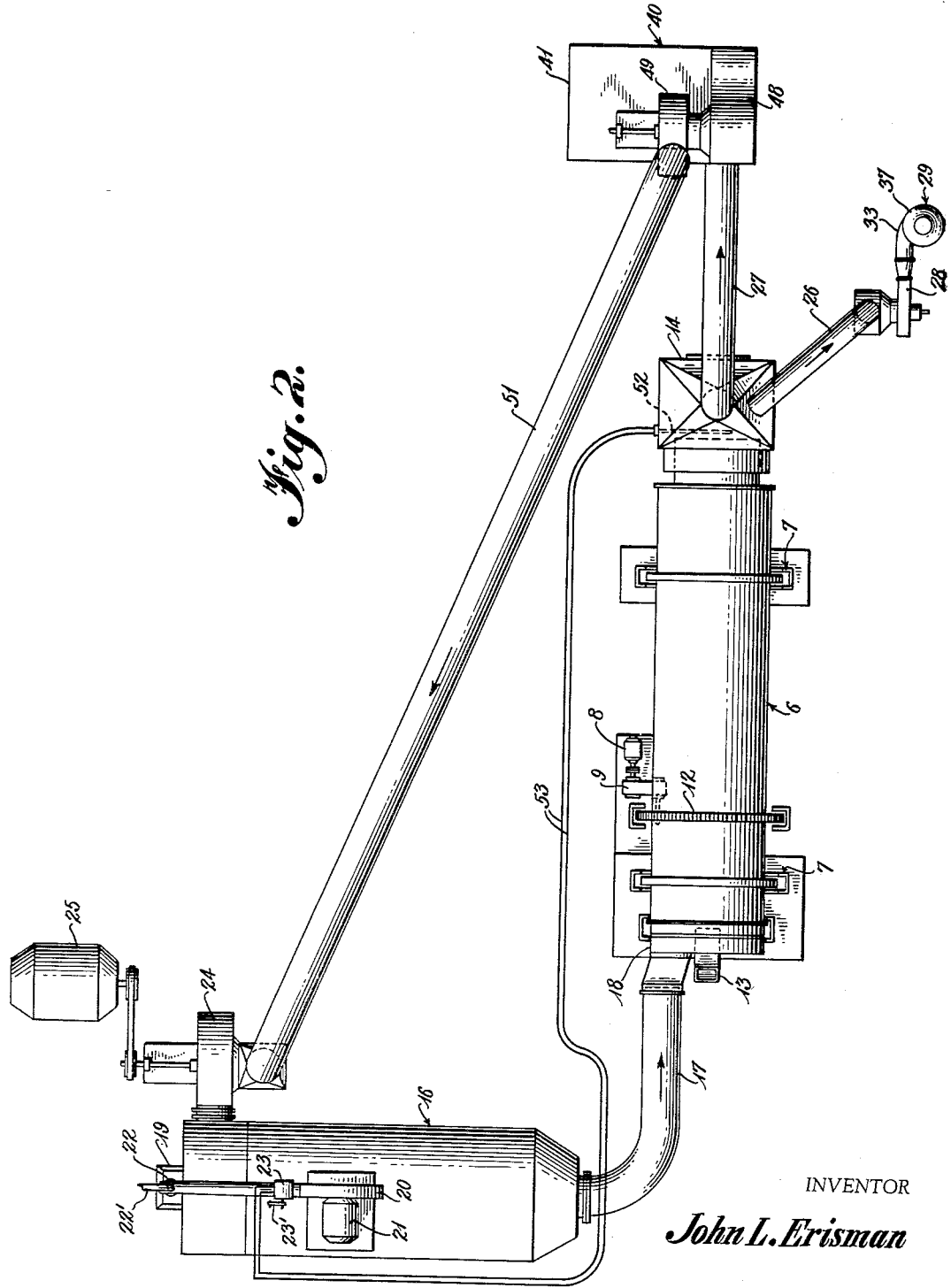
Fig. 2.
INVENTOR
John L. Erisman
BY 
ATTORNEY

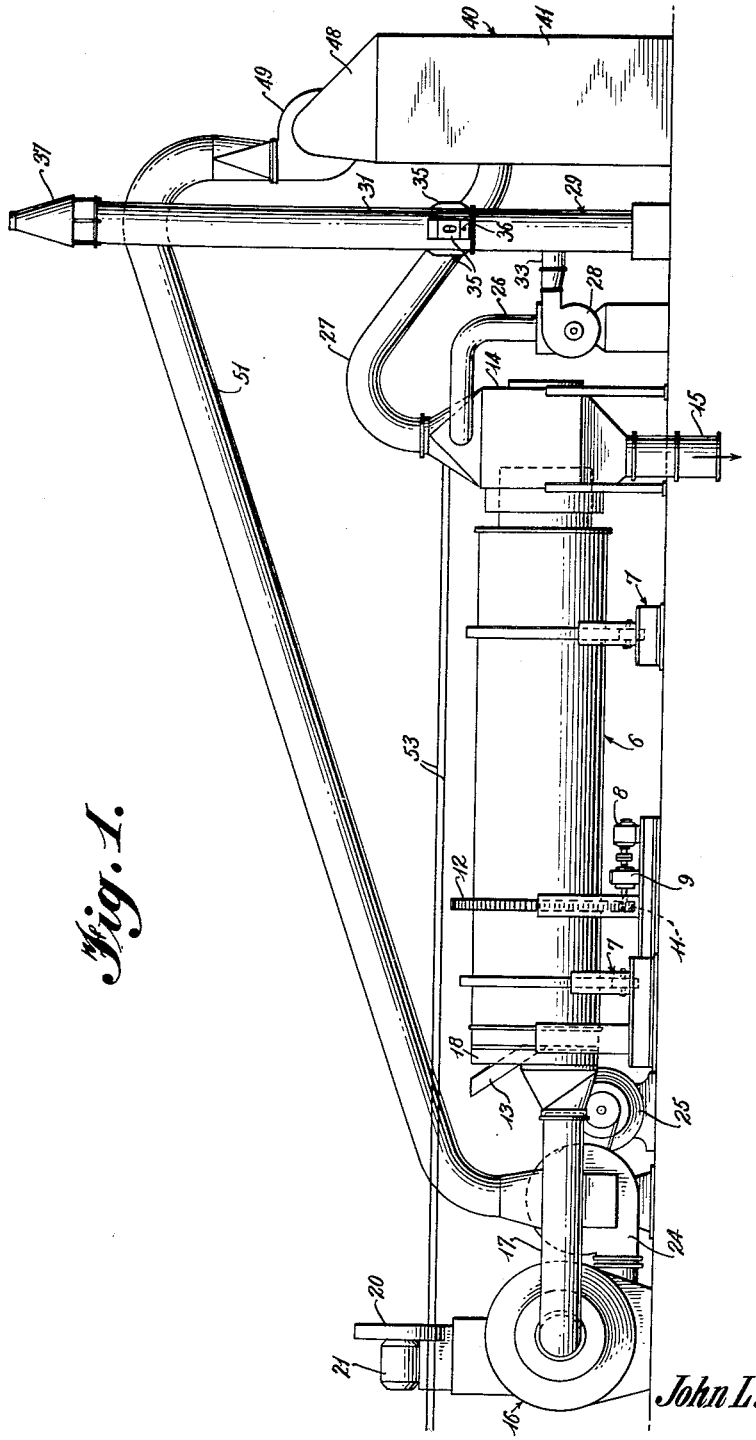

United States Patent Office 2,720,710
Patented Oct. 18, 1955

2,720,710

METHOD FOR DRYING METAL SCRAP

John L. Erisman, Oak Park, Ill., assignor to Link-Belt Company, a corporation of Illinois Application December 22, 1952, Serial No. 327,215

12 Claims. (Cl. 34—28)

This invention relates to a new and useful method of drying metal scrap, such as chips, filings, turnings, and the like, which are produced in machining operations, and deals more particularly with the removal of cutting oils and water from such metal scrap.

It has been a common practice in the past to process the metal scrap that results from machining operations for recovery of the cutting oil. Because the value of such metal scrap was formerly very low, little attention was given to the deteriorating effect the various oil recovery processes had on such scrap or to the preparation of the scrap for re-use. Recently, however, the value of such metal scrap has risen to an extent which makes it increasingly important to develop an economical process for removing the cutting oil and water from the scrap to prepare the latter for re-use. Of course, oxidation of the metal should be held to a minimum to provide a maximum recovery and to improve the quality of certain processed metals. Also, the combustible mixture that may be produced if the cutting oil vapors are permitted to mix with the proper amount of oxygen presents a difficult problem in the prevention of fires and explosions in such metal scrap recovery operations.

It is the primary object of this invention to provide a method for treating metal scrap to rapidly remove volatile wetting liquids therefrom in such a manner as to prevent ignition of the liquid vapors and substantial oxidation of the metal scrap.

A further important object of the invention is to provide a method for uniformly drying metal scrap at an elevated temperature to accelerate the drying and in a manner which will prevent an increase in the oxidation of the metal proportionate with the elevated drying temperature.

A still further object of the invention is to provide a method for uniformly removing volatile wetting liquids from metal scrap by means of substantially inert gases which are heated sufficiently to obtain accelerated drying with a minimum amount of oxidation and without danger of ignition or explosion of the evaporated liquids.

Other objects and advantages of the invention will be apparent during the course of the following description.

In the accompanying drawings forming a part of this specification and in which like reference characters are employed to designate like parts throughout the same, Figure 1 is a side elevational view of one form of treatment plant that has been developed to carry out the method of this invention, Figure 2 is a top plan view of the plant illustrated in Fig. 1, Figure 3 is a vertical sectional view of the smoke burner that forms a part of the plant equipment, Figure 4 is a vertical sectional view of a hydrostatic type dynamic precipitator illustrated in Figs. 1 and 2, and Figure 5 is a fragmentary elevational view showing the arrangement of the combustion blower with its motor and the burner with its control motor of the dryer portion of the plant.

In the drawings, wherein for the purpose of illustration is shown the preferred form of apparatus for carrying out the invention, and first particularly referring to Figs. 1 and 2, the reference character 6 designates a horizontally arranged rotatable dryer of the type illustrated in my patent, No. 2,522,025, dated September 12, 1950, for Rotary Dryer or Cooler. This dryer 6 has positioned within its outer cylindrical housing an internal material supporting shell formed of a plurality of tangentially arranged, longitudinally extending louvres between which the drying gases pass for delivery to the bed of material advancing longitudinally through the dryer. The dryer housing is supported for rotation about a horizontal axis by trunnions 7 and is driven by a motor 8 through a speed reducing unit 9 which drives the pinion gear 11 that is in engagement with the gear ring 12 extending around the dryer. The material to be dried is introduced into the dryer 6 through a feed chute 13 at one end and is discharged from the dryer at its opposite end into the exhaust hood 14 where it drops downwardly through the discharge chute 15.

The treatment gases, which are an inert mixture of gaseous products of combustion and recycled off-gases, are fed into the dryer 6 from an oil or gas fired heater 16 through the duct 17 and the inlet manifold 18. The heater 16 has mounted thereon a burner unit 19 which is provided with a combustion blower 20, driven by a motor 21, for supplying air under pressure to the mixing chamber 22. This air is mixed with gas or oil delivered through the pipe 22' and introduced as a combustible fuel into the burner unit 19. Within the heater 16, this fuel is burned in direct heat exchange relation with recycled off-gases so as to render the off-gases inert. In other words, any oxygen which is introduced with the mixture of air and fuel and which is not consumed by the burning of the fuel together with any oxygen which is present due to leakage of air into the stream of treatment gases will be consumed by burning of a portion of the combustible vapors in the off-gases as will be later described. The amount of fuel and air introduced into the burner unit 19 for combustion is controlled to properly adjust the temperatures of the inert mixture of gases entering the dryer by regulating the flow of air into the mixing chamber 22 by means of a control motor 23 which is connected through a suitable linkage 23' to the flow regulator 23''. The recycled off-gases to be heated and rendered inert are introduced into the heater 16 by an inlet fan 24 which is driven by the motor 25.

The off-gases flowing from the dryer 6, having passed through the bed of material advancing through the dryer and evaporated the cutting oil, or the like, with which the material was wetted, contain such oil in its vaporous state when they enter the exhaust hood 14. The exhaust hood has connected thereto a bleed-off stack 26 and an exhaust stack 27. The bleed-off stack 26 is connected to a fan 28 which effects withdrawal of a portion of the off-gases from the exhaust hood 14 and introduces such withdrawn portion into the smoke burner 29.

As is best illustrated in Fig. 3, the smoke burner 29 is formed with an upright cylindrical casing 31, the upper portion of which is lined with a refractory material 32. The off-gases removed from the exhaust hood 14 through the bleed-off stack 26 enter the smoke burner 29 through an involute section 33 near the bottom of the casing 31. Extending upwardly from the bottom of the casing 31 is a deflector shell 34 having a conical upper end portion with its apex extending upwardly to deflect the off-gases in the involute section 33 toward the upper portion of the smoke burner 29. At the base of the refractory lined portion of the casing 31 are multiple gas burner units 35 which are inclined angularly upwardly within the smoke burner 29 and are sealed in the casing 31. Immediately below each of the burners 35 is an opening 36 to provide admission of secondary air for burners 35 and excess air which will be mixed with the portion of the off-gases that is removed from the exhaust hood 14 to form a combustible mixture that will be ignited by the flame from the gas burners 35. A frusto-conical cap 37 is arranged in axial alinement with and spaced from the top of the casing 31 so that air will be drawn into the stream of combustion gases discharged to the atmosphere from the upper end of the burner 29 to avoid the possibility of creating a smoke nuisance. Various types of fuels may be used in connection with the burners 35, including a mixture of combustible gas and air, the selected components of which enter the burners through pipe lines 38 and 39.

The portion of the off-gases that remains in the exhaust hood 14 beyond the entrance to the bleed-off stack 26 is passed through the stack 27 to a hydrostatic type precipitator unit 40. As illustrated in Fig. 4, this precipitator unit 40 is formed of a boxlike casing 41 containing a body of water 42 in its bottom portion which may be maintained at the indicated level by any suitable means, not shown. The portion of the casing 41 located above the level of the water 42 is divided into an inlet chamber 43 and an exhaust chamber 44 by a partition 45. Joined to the lower edge of the partition 45 is a passageway 46 which is S-shaped in vertical cross section and extends entirely across the precipitator casing 41. The bottom end of the passageway 46 is located below the level of the water 42 and communicates with the inlet compartment 43 while the top of the passageway 46 is located above the level of the water and opens into the exhaust compartment 44. A filter 47 extends across the exhaust compartment 44 above the top of the passageway 46 and an exhaust duct 48 connects the upper portion of the compartment 44 with the inlet side of a fan 49.

It will be readily apparent that when the fan is operated to exhaust the compartment 44 of the unit 40, the off-gases from the dryer 6 will be drawn from the inlet compartment 43 through the water 42 and into the S-shaped passageway 46 at the bottom of the partition 45. During their passage through the water, the hot gases will convert a certain amount of the water to steam which will be entrained by the off-gases and carried to the fan 49 and the duct 51 leading therefrom. It has been stated above that the off-gases exhausted from the dryer 6 include the vaporized cutting oil that has been removed from the scrap metal passed through the dryer. Therefore, the entrainment of steam by the off-gases provides a more inert or dilute mixture to be delivered to the heating unit 16. The duct 51, to which the relatively inert mixture of off-gases and steam is delivered by the fan 49, is connected to the inlet side of the fan 24 for the heating unit 16. As has been explained above, the relatively inert mixture of off-gases and steam is delivered to the heating unit 16 where it is exposed to the flame of the burner unit 22. This flame effects such ignition as is possible of the cutting oil vapors of the gas mixture that is fed to the heating unit 16 by the fan 24, so that the hot treatment gases that are delivered to the inlet manifold 18 of the dryer 6 are of such a character, or composition and temperature, as to enable the treatment gases to vaporize the cutting oils and combine with the resulting vapors without forming a combustible mixture. This vaporization effects substantially complete removal of the cutting oils from the metal scrap.

Considering now the operation of the above described apparatus in carrying out the method of the invention, the dryer 6 is started and the material to be dried is introduced through the feed chute 13. This material consists of small metal scrap particles such as turnings, filings, chips and the like, that may be produced by various machining operations. When introduced into the dryer 6, the metal scrap is wet with a cutting oil used in machining operations which is usually an emulsion containing a certain amount of water. The material introduced into the dryer 6 forms a bed, the particles of which are gently rolled over upon themselves by the rotation of the dryer, and is advanced lengthwise through the dryer to the discharge hood where it is delivered through the chute 15.

As the metal particles advance through the dryer, they are continuously subjected to the drying action of the hot treatment gases flowing from the heater 16 through the duct 17 and inlet manifold 18 into the dryer. The temperature of the drying gases is regulated by the burner control motor 23 which is controlled by a thermostatic control element 52 positioned in the exhaust hood 14 and connected by the control lines 53 to the motor 23, see Figs. 2 and 3. Because of the composition of the treatment gases, oxidation of the metal particles in the dryer 6 is maintained at a minimum and the danger of fire or explosion of the oil vapors of the drying gases is eliminated.

Since the particle size and characteristics of the metal scrap to be treated, the amount of oxidation of the treated scrap that will be permitted, and the amount and type of liquids with which the untreated scrap is wetted may vary greatly for each installation, the apparatus that is employed for carrying out the method must be capable of performing under a wide range of operating conditions. The required variations in operating conditions are provided by controlling the heat supplied to the material by the drying gases passing through the dryer 6 and by varying the rate of feed of the material to the inlet chute 13.

Considering first the control of the heat supplied by the drying gases and the inherent limitations of the apparatus by which the method is carried out, it will be readily apparent that the heat supplied may be controlled by varying the temperature of the gases entering the dryer 6 at a given constant rate. The temperature, of course, must exceed the minimum value which will effect evaporation of the particular mixture of cutting oil and water carried by the metal scrap and must not approach too closely the temperature at which the scrap would be oxidized to an objectionable extent; that is, to an extent which would substantially reduce the value of the scrap for subsequent use. The supply of heat may also be controlled by regulating the volume of the drying gases. The maximum permissible temperature of the drying gases flowing through the dryer 6 at a given rate, therefore, will depend for the most part on the type of metal scrap which is being treated. In other words, steel scrap may be subjected to temperatures much higher than aluminum or copper. As a further consideration in determining the maximum temperature to which the particles may be subjected, it will be noted that upon removal of the particles from the inert atmosphere of the dryer 6 through the discharge chute 15, the oxidation of the metal in the presence of air will be accelerated as the discharge temperature of the metal is increased.

Further variation in the operating conditions quite obviously can be provided by changing the rate at which the wetted material is introduced to the dryer and the length of time the material is exposed to the drying gases.

Considering now the relationship of the two variables in operating conditions, it may be broadly stated that for any particularly starting material that is wetted with varying percentages of cutting oil and water, the rate of flow of the material and the temperature of the drying gases may be both increased or decreased within the broad limitations discussed above so long as there is maintained such a relationship between the two as will effect the desired degree of drying of the material just prior to its discharge into the hopper 14.

It will be readily apparent that the above discussed limitations with respect to the variables in operating conditions are applicable to the process of the invention regardless of the type and condition of the material to be treated. In actual practice, however, it has been found that a reduction of the temperature of the drying gas substantially below 200° F. will require such a long retention period for the material as to render the process impractical, while a temperature that is substantially above 1200° F. will shorten the retention period to a mechanically impractical time interval. Further, at temperatures substantially above 1200° F. the oxidation of the material as it is discharged to the atmosphere is ordinarily so excessive as to be objectionable. Ordinarily, therefore, the temperature of the drying gases will be maintained within a range of from 200° F. to 1200° F.

Since the temperature of the drying gases and the rate of flow of the material through the dryer 6 may be varied in a direct relationship while effecting the desired drying of the material just prior to its discharge from the dryer 6, the range of temperatures at which the drying gases are introduced into the material in the dryer 6 usually will be restricted to a more limited range. For most practical and economical operations, a range of temperatures of from 500° F. to 1000° F. is sufficient to provide satisfactory drying of the material despite wide variations in the type and amount of liquid with which the material is wetted. It will be understood, of course, that this range of temperatures must also be accompanied by a corresponding range in the rate of flow of the material through the dryer 6.

The following examples illustrate the manner in which the operating conditions may be varied within the above described range to provide satisfactory drying of the metal particles with a negligible amount of oxidation:

Aluminum chips wetted with a mixture of oil and water amounting to a total of from 10 to 12 percent of the total weight of the chips and liquid were treated with drying gases at a temperature of 700° F. while flowing through the dryer 6 at a rate of 19.2 cubic feet per hour. In this test, there was practically no oxidation of the chips and only a negligible amount of liquid remaining on the material after the drying process.

Aluminum chips wetted with from 0.7 to 2.5 percent by weight of oil and 3.6 percent by weight of water were dried by gas entering the material at a temperature of from 548° F. to 585° F. with the material flowing through the dryer at a rate of 18.1 cubic feet per hour. There was practically no oxidation of the chips and the processed chips contained only from 0.0 to 0.15 percent by weight of oil.

Aluminum chips wetted with a mixture of from 5.6 to 9.1 percent by weight of oil and from 12 to 14 percent by weight of water were dried with gases at a temperature of from 730° F. to 870° F. and with the rate of flow of the material through the dryer 6 at 20.2 cubic feet per hour. Under these conditions, the oxidation of the material was negligible and the amount of oil remaining on the material after processing ranged from 0.0 to 0.2 percent by weight.

Aluminum chips wetted with oil amounting to from 8.75 to 14.0 percent of the total weight were dried with gases at a temperature of 900° F. and with the rate of flow of the material through the dryer 6 at 24.7 cubic feet per hour. Again, the oxidation of the chips was negligible and the oil remaining on the processed chips was only from 0.0 to 0.25 percent of the total weight.

In each of the above specific examples, the drying of the material was successfully carried out without ignition of any of the evaporated cutting oil within the dryer or duct work and the smoke burner 29 successfully eliminated any nuisance which would have been created by an excess amount of oil vapor in the withdrawn portion of the off-gases. In each of the above examples, the material processed was aluminum chips, but it is to be understood that other metal particles may be processed under similar operating conditions with equally successful results.

It is to be understood that I do not desire to be limited to the exact order of method steps as they have been disclosed for variations and modifications of the same, which fall within the scope of the subjoined claims, are contemplated.

Having thus described the invention, I claim:

1. A method of removing cutting oils and the like from metal scrap that is wetted therewith, comprising forming a flowing stream of gases, passing the stream of gases through a zone in which a combustible mixture of fuel and air is burned to increase the temperature of the gases in the stream and to convert the active gases in the stream to inert gases, substantially excluding the admission of air to said stream apart from the air of said combustible mixture, passing the stream of heated, inert gases through an agitated bed of metal scrap to evaporate the wetting liquid and entrain the resulting vapor in the flowing stream of off-gases, separating a portion of the off-gases from the stream, and recirculating the off-gases remaining in said stream to said zone in which the combustible fluid is burned.

2. A method of removing cutting oils and the like from metal scrap that is wetted therewith, comprising forming a flowing stream of gases, passing the stream of gases through a zone in which a combustible mixture of fuel and air is burned to increase the temperature of the gases in the stream and to convert the active gases in the stream to inert gases, substantially excluding the admission of air to said stream apart from the air of said combustible mixture, passing the stream of heated, inert gases through an agitated bed of wetted metal scrap to evaporate the wetting liquid and entrain the resulting vapor in the flowing stream of off-gases, separating a portion of the off-gases from the stream, mixing air with said separated off-gases in the presence of an open flame to effect combustion of the mixture, releasing the resulting gases to the atmosphere, and recirculating the off-gases remaining in the said stream to said zone in which the combustible fluid is burned.

3. A method of removing cutting oils and the like from metal scrap that is wetted therewith, comprising forming a flowing stream of a mixture of gases, passing the stream of gases through a zone in which a combustible mixture of fuel and air is burned to increase the temperature of the gases flowing in the stream and to convert the active gases in the stream to inert gases, substantially excluding the admission of air to said stream apart from the air of said combustible mixture, passing the stream of heated, inert gases through an agitated bed of wetted metal scrap to evaporate the wetting liquid and entrain the resulting vapor in the flowing stream of off-gases, separating a portion of the off-gases from said stream, passing the remaining hot off-gases in said stream through a water bath to evaporate a portion of the water and entrain the resulting vapor therein, and returning the resulting mixture of off-gases and water vapor to the zone in which the combustible fluid is burned.

4. A method of removing cutting oil and the like from metal scrap that is wetted therewith, comprising forming a flowing stream of gases, passing the stream of gases through a zone in which a combustible mixture of fuel and air is burned to increase the temperature of the gases in the stream to a predetermined value and to convert the active gases in the stream to inert gases, substantially excluding the admission of air to said stream apart from the air of said combustible mixture, passing the stream of heated, inert gases through an agitated bed of wetted metal scrap for a sufficient period of time to evaporate the wetting liquid and entrain the resulting vapor in the flowing stream of off-gases, the predetermined temperature of the drying gases having a value below that at which the smallest sized metal particles in said bed would be objectionably oxidized during their movement in contact with said stream, separating a portion of the off-gases from said stream, and recirculating the remaining off-gases in said stream to said zone in which the combustible fluid is burned.

5. A method of removing cutting oil and the like from metal scrap that is wetted therewith, comprising forming a flowing stream of gases, passing the stream of gases through a zone in which a combustible mixture of fuel and air is burned to increase the temperature of the gases in the stream to a predetermined value and to convert the active gases in the stream to inert gases, substantially excluding the admission of air to said stream apart from the air of said combustible mixture, passing the stream of heated, inert gases through an agitated bed of wetted metal scrap for a sufficient period of time to evaporate the wetting liquid and entrain the resulting vapor in the flowing stream of off-gases from the bed, the predetermined temperature of the drying gases having a value below that at which the smallest sized metal particles in said bed would be objectionably oxidized during their movement in contact with said stream, separating a portion of the off-gases from said stream, mixing the separated off-gases with air in the presence of an open flame to effect combustion of the mixture, releasing the resulting combustion gases to the atmosphere, and recirculating the off-gases remaining in said stream to said zone in which the combustible fluid is burned.

6. A method of removing cutting oil and the like from metal scrap that is wetted therewith, comprising forming a flowing stream of gases through a closed path, passing the stream of gases through a zone in said path in which a variable amount of a combustible mixture of fuel and air is burned to increase the temperature of the gases in said stream and to convert the active gases in the stream to inert gases, substantially excluding the admission of air to said stream apart from the air of said combustible mixture, passing the stream of heated, inert gases through an agitated bed of wetted metal scrap for a given period of time, controlling the amount of combustible fluid that is burned at said zone in response to changes in the temperature of the off-gases from said bed to maintain the temperature of the gases entering the bed at a value at which the metal scrap is substantially completely dried during said given period of time and the resulting vapor is entrained in the flowing stream of off-gases, and separating from said closed path a portion of the off-gases from said bed.

7. A method of removing cutting oil and the like from metal scrap that is wetted therewith, comprising forming a flowing stream of gases through a closed path, passing the stream of gases through a zone in which a variable amount of a combustible mixture of fuel and air is burned to increase the temperature of the gases in the stream and to convert the active gases in the stream to inert gases, substantially excluding the admission of air to said stream apart from the air of said combustible mixture, passing the stream of heated, inert gases through an agitated bed of wetted metal scrap for a given period of time, controlling the amount of combustible fluid that is burned at said zone in response to changes in the temperature of the off-gases from said bed to maintain the temperature of the gases entering the bed at a value at which the metal scrap will be substantially completely dried during said given period of time and the resulting vapor will be entrained in the flowing stream of off-gases, separating from said closed path a portion of the off-gases from said bed, adding water vapor to the remaining off-gases in said stream, and recirculating the remaining off-gases and water vapor to said zone in which the combustible fluid is burned.

8. A method of removing cutting oil and the like from metal scrap that is wetted therewith, comprising forming a flowing stream of gases, passing the stream of gases through a zone in which a variable amount of combustible mixture of fuel and air is burned to increase the temperature of the gases in the stream to a predetermined value and to convert the active gases in the stream to inert gases, substantially excluding the admission of air to said stream apart from the air of said combustible mixture, passing the stream of heated, inert gases through an agitated bed of wetted metal scrap for a given period of time, the predetermined temperature of the drying gases being such that the metal scrap is dried during said given period of time and the resulting vapor is entrained in the flowing stream of off-gases, said predetermined temperature being above approximately 200° F. and below that at which the smallest sized particles in said bed would be objectionably oxidized during said given period of time, separating a portion of the off-gases from said stream, and recirculating the off-gases remaining in said stream to said zone in which the combustible fluid is burned.

9. A method of removing cutting oil and the like from metal scrap that is wetted therewith, comprising forming a flowing stream of gases, passing the stream of gases through a zone in which a variable amount of combustible mixture of fuel and air is burned to increase the temperature of the gases in the zone to a value within the range of about 200° F. to about 1200° F. and to convert the active gases in the stream to inert gases, substantially excluding the admission of air to said stream apart from the air of said combustible mixture, passing the stream of heated, inert gases through a bed of wetted metal scrap for a sufficient period of time to evaporate the wetting liquid and entrain the resulting vapor in the flowing stream of off-gases leaving the bed, separating a portion of the off-gases from said stream, adding water vapor to the off-gases remaining in said stream, and recirculating the remaining off-gases and vapor to said zone in which the combustible fluid is burned.

10. A method of removing cutting oil and the like from metal scrap that is wetted therewith, comprising forming a flowing stream of gases, passing the stream of gases through a zone in which a combustible mixture of fuel and air is burned to increase the temperature of the gases in the zone to a value within the range of about 500° F. to about 1000° F. and to convert the active gases in the stream to inert gases, substantially excluding the admission of air to said stream apart from the air of said combustible mixture, passing the stream of heated, inert gases through a bed of wetted metal scrap for a sufficient period of time to evaporate the wetting liquid and entrain the resulting vapor in the flowing stream of off-gases from the bed, separating a portion of the off-gases from said stream, adding water vapor to the off-gases remaining in said stream, and recirculating the remaining off-gases and vapor to said zone in which the combustible fluid is burned.

11. A method of removing cutting oil and the like from metal scrap that is wetted therewith, comprising forming a flowing stream of gases, passing the stream of gases through a zone in which a combustible mixture of fuel and air is burned to increase the temperature of the gases in the zone to a value within the range of about 548° F. to about 900° F. and to convert the active gases in the stream to inert gases, substantially excluding the admission of air to said stream apart from the air of said combustible mixture, passing the stream of heated, inert gases through a bed of wetted metal scrap for a sufficient period of time to evaporate the wetting liquid and entrain the resulting vapor in the flowing stream of off-gases from the bed, separating a portion of the off-gases from said stream, and recirculating the remaining off-gases and vapor to said zone in which the combustible fluid is burned.

12. A method of removing cutting oil and the like from metal scrap that is wetted therewith, comprising forming a flowing stream of mixture of gases through a closed path, passing the stream of gases through a zone in said path in which a combustible mixture of fuel and air is burned to increase the temperature of the gases in the stream and to convert the active gases in the stream to inert gases, substantially excluding the admission of air to said stream apart from the air of said combustible mixture, passing the stream of heated, inert gases through a bed of metal scrap that is wetted with a varying percent by weight of volatile liquids at least a portion of which are combustible in an ambient atmosphere, maintaining a relationship between the period of time during which the gases flow through the bed and the temperature of the gases entering said bed which will effect complete evaporation of the volatile liquids with the temperature of the drying gases being below that at which the smallest sized particles in the bed would be objectionably oxidized during said period, and separating a portion of the off-gases leaving said bed from said closed path.

References Cited in the file of this patent

UNITED STATES PATENTS

| | | |
|---|---|---|
| 942,150 | Tiemann | Dec. 7, 1909 |
| 1,557,880 | Richter | Oct. 20, 1925 |
| 1,629,116 | Muehlenbeck | May 17, 1927 |
| 1,752,857 | Seede | Apr. 1, 1930 |
| 2,412,133 | Doyle | Dec. 3, 1946 |